| (12) | United States Patent | (10) Patent No.: | US 9,214,306 B2 |
|---|---|---|---|
| | Yoshida et al. | (45) Date of Patent: | Dec. 15, 2015 |

(54) GAS INSULATED SWITCHGEAR

(75) Inventors: Tadahiro Yoshida, Tokyo (JP); Masahiro Arioka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 287 days.

(21) Appl. No.: 13/882,714

(22) PCT Filed: Jan. 25, 2011

(86) PCT No.: PCT/JP2011/051292
§ 371 (c)(1),
(2), (4) Date: Apr. 30, 2013

(87) PCT Pub. No.: WO2012/063501
PCT Pub. Date: May 18, 2012

(65) Prior Publication Data
US 2013/0213937 A1 Aug. 22, 2013

(30) Foreign Application Priority Data

Nov. 12, 2010 (JP) ................. 2010-253729

(51) Int. Cl.
*H01H 33/662* (2006.01)
*H01H 33/56* (2006.01)
(Continued)

(52) U.S. Cl.
CPC ........... *H01H 33/565* (2013.01); *H01H 33/662* (2013.01); *H01H 33/666* (2013.01); *H01H 33/66238* (2013.01); *H01H 2033/6665* (2013.01); *H02B 13/0354* (2013.01)

(58) Field of Classification Search
CPC ............... H01H 33/66; H01H 33/662; H01H 33/66238; H01H 33/565; H01H 33/666
USPC ............. 218/3, 7, 10, 18, 120, 124, 134, 135, 218/140, 153, 154
See application file for complete search history.

(56) References Cited

U.S. PATENT DOCUMENTS

| 4,525,612 A | 6/1985 | Kawashima |
|---|---|---|
| 5,191,180 A * | 3/1993 | Kitamura et al. ............. 218/135 |

(Continued)

FOREIGN PATENT DOCUMENTS

| CN | 101395686 A | 3/2009 |
|---|---|---|
| CN | 101620948 A | 1/2010 |

(Continued)

OTHER PUBLICATIONS

First Office Action issued on Dec. 2, 2014, by the Chinese Patent Office in corresponding Chinese Patent Application No. 201180053660.0, and an English Translation of the Office Action. (17 pages).

(Continued)

*Primary Examiner* — Amy Cohen Johnson
*Assistant Examiner* — Marina Fishman
(74) *Attorney, Agent, or Firm* — Buchanan Ingersoll & Rooney PC (57) ABSTRACT

A gas insulated switchgear includes a vacuum interrupter having a movable contact and a fixed contact in vacuum. The movable contact is on one side of a movable conductor that passes through a bellows. An insulating rod is coupled to the other side of the movable conductor that passes through the bellows. The insulating rod and the other side of the movable conductor are placed in an insulator. The vacuum interrupter, the insulating rod, and the insulator are disposed in a gas tank. An operating mechanism is disposed on a movable side end portion of the gas tank and connected to the insulating rod. An inner circumferential side space of the bellows, an internal space of the insulator, and an internal space of the operating box are in communication with each other; and pressure in these spaces is lower than pressure in the gas tank.

16 Claims, 5 Drawing Sheets

(51) Int. Cl.
  *H01H 33/666* (2006.01)
  *H02B 13/035* (2006.01)

(56) References Cited

U.S. PATENT DOCUMENTS

| | | | | |
|---|---|---|---|---|
| 8,723,070 | B2* | 5/2014 | Yoshida et al. | 218/134 |
| 2010/0000973 | A1 | 1/2010 | Tsuchiya et al. | |
| 2010/0288733 | A1 | 11/2010 | Ichikawa et al. | |
| 2013/0155640 | A1* | 6/2013 | Sano et al. | 361/816 |

FOREIGN PATENT DOCUMENTS

| | | | |
|---|---|---|---|
| DE | 3319010 | A1 | 11/1983 |
| DE | 4210370 | A1 | 10/1993 |
| DE | 4212756 | A1 | 10/1993 |
| DE | 29620438 | U1 | 1/1997 |
| DE | 19952720 | A1 | 6/2000 |
| DE | 102006015310 | B3 | 8/2007 |
| JP | 60-141038 | U | 7/1985 |
| JP | 2003-111225 | A | 4/2003 |
| JP | 2004-056845 | A | 2/2004 |
| JP | 2004-220922 | A | 8/2004 |
| JP | 2005-086925 | A | 3/2005 |
| JP | 2007-306701 | A | 11/2007 |
| JP | 2010-178526 | A | 8/2010 |

OTHER PUBLICATIONS

International Search Report (PCT/ISA/210) issued on Mar. 1, 2011, by the Japanese Patent Office as the International Searching Authority for International Application No. PCT/JP2011/051292.
Office Action issued on Sep. 4, 2015 by the German Patent Office in corresponding German Patent Application No. 11 2011 103 758.9 and an English Translation of the Office Action (18 pages).

* cited by examiner

GAS INSULATED SWITCHGEAR

TECHNICAL FIELD

The present invention relates to, for example, gas insulated switchgears for use in electric power transmission/distribution and reception facilities and, more particularly, relates to a gas insulated switchgear in which a vacuum interrupter is placed in a gas tank filled with an insulating gas.

BACKGROUND ART

Heretofore, for example, as gas insulated switchgears for use in electric power transmission/distribution and reception facilities, there has been known one which is disclosed in Patent Document 1 (Japanese Unexamined Patent Publication No. 2007-306701).

In order to reduce differential pressure of a bellows portion of a vacuum interrupter, a part of a vacuum interrupter movable portion (an insulating rod is in high pressure) and the inside of a cylindrical conductor connected to the movable portion are made to communicate with the ambient atmosphere.

Figure 5:
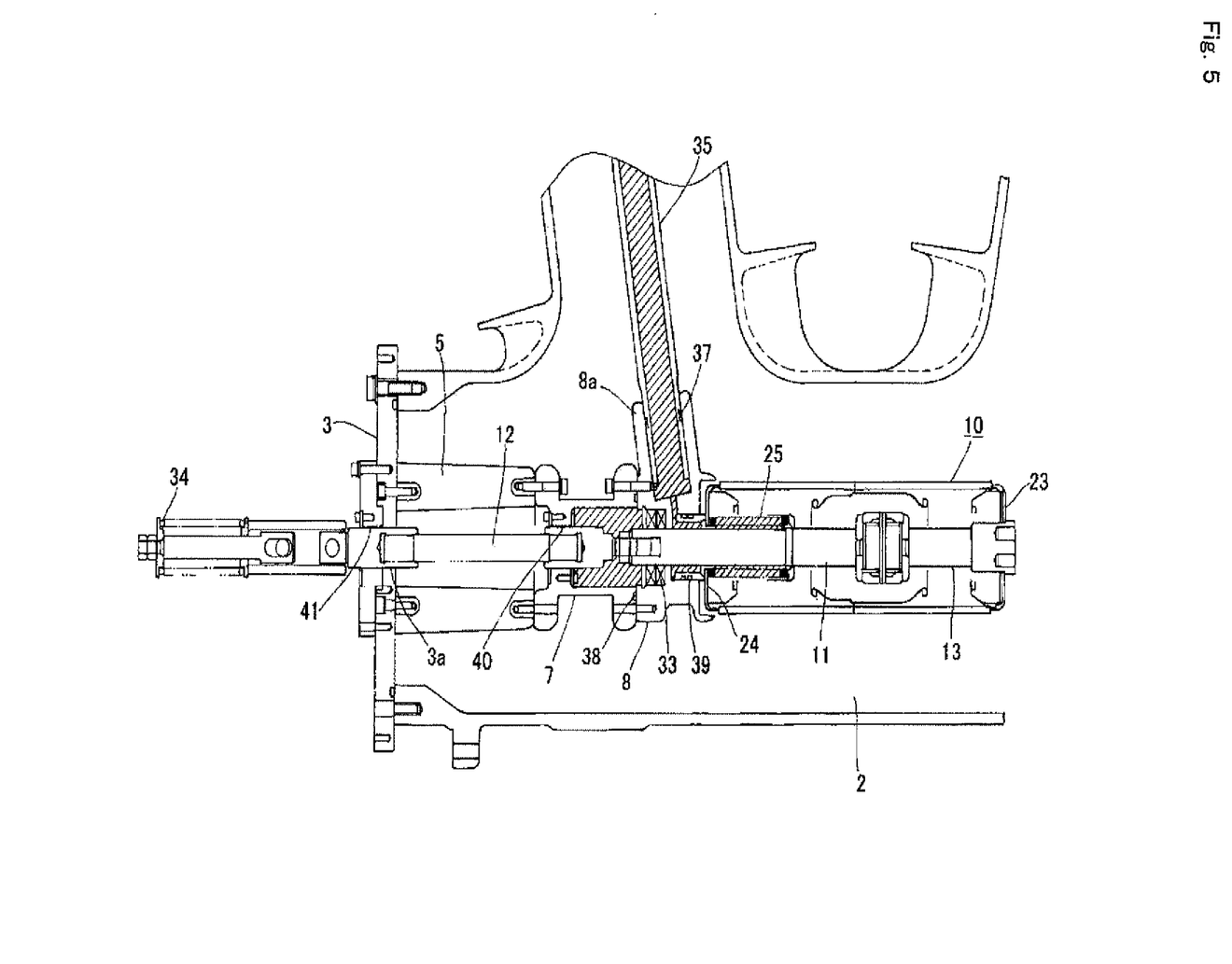
FIG. 5 is a relevant part enlarged sectional view showing a conventional gas insulated switchgear.

That is, a portion which communicates with the inner circumferential side of a bellows 25 and in which a high electric field is not applied is set to atmospheric pressure in order to set the inner circumferential side of the bellows 25 of a vacuum interrupter 10 serving as the vacuum interrupter to the atmospheric pressure. More specifically, the inside of a movable side conductor 35, the inside of a support 7, and the inside of a movable side contact case 8 are set to the atmospheric pressure.

Therefore, a high temperature sealing portion (portion sealed at a high temperature) 37 serving as an airtight sealing portion is provided between the outer circumference of the movable side conductor 35 and a tubular portion 8a of the movable side contact case 8; a high temperature sealing portion 38 serving as an airtight sealing portion is provided between the support 7 and the movable side contact case 8; and a high temperature sealing portion 39 serving as an airtight sealing portion is provided between a movable side end plate 24 of the vacuum interrupter 10 and the movable side contact case 8. Furthermore, in order to set the inside of an insulation support tube 5 to high pressure dry air, a linear sealing portion 40 serving as an airtight sealing portion is provided between an insulation operating rod 12 and the support 7.

Patent Document 1: Japanese Unexamined Patent Publication No. 2007-306701

DISCLOSURE OF THE INVENTION

Problems to be Solved by the Invention

The aforementioned conventional gas insulated switchgear has linear sealing portions 40 and 41 serving as a sliding airtight sealing portion in the movable portion of the vacuum interrupter 10; and therefore, a dedicated gasket which is for sliding while securing airtight is required and the linear sealing portions 40 and 41 become a structure susceptible to attachment and interfusion of foreign materials and flaw of constitutional components. Accordingly, a problem exists in that high quality is required for constitutional components for maintaining airtight for a long period and high cost is required achieve these requirements.

Besides, countermeasures against the driving force of the insulation operating rod 12 that passes through the linear sealing portions 40 and 41 being maintained airtight and the driving force of an operating mechanism to which the insulation operating rod 12 is coupled are required. Frictional loads of those components are large; and therefore, a problem exists in that a lot of operation energy is required for the operating mechanism to which the insulation operating rod 12 is coupled.

Additionally, as for the high temperature sealing portions 37 to 39, a problem exists in that it becomes high cost, for example, a gasket endurable against a high temperature is applied.

In addition, in order to set the inner circumferential side of the bellows 25 to the atmospheric pressure, the inside of the movable side conductor 35, the inside of the support 7, and the inside of the movable side contact case 8 are set to the atmospheric pressure. However, the atmosphere is taken in from a ventilation opening portion 20a of an upper end bushing terminal 20 of a bushing 16 whose height is 2 m to 3 m.

In this case, the inner surface of the cylindrical movable side conductor 35 and the like, which are exposed to the atmosphere, are likely to be corroded due to high humidity and contaminating atmosphere (NOx, SOx, and the like) depending on installation circumstances of the gas insulated switchgear. Furthermore, countermeasures for preventing contamination and corrosion need to be provided. In addition, in order to seal this portion, a gas filling port needs to be provided on a high voltage portion, which is practically impossible.

The present invention has been made to solve the foregoing problem, and an object of the present invention is to provide a gas insulated switchgear capable of reducing differential pressure of a bellows portion of a vacuum interrupter.

Means for Solving the Problems

According to a first aspect of the present invention, there is provided a gas insulated switchgear including: a vacuum interrupter having a movable contact and a fixed contact in vacuum, the movable contact being provided on one side of a movable conductor that passes through a bellows, and the fixed contact being provided on a fixed conductor; an insulating rod coupled to the other side of the movable conductor that passes through the bellows of the vacuum interrupter; an insulator in which the insulating rod and the other side of the movable conductor are placed, and by which the vacuum interrupter is electrically insulated and supported; a movable side shield which intervenes between the vacuum interrupter and the insulator, and surrounds the outer circumference of the other side of the movable conductor along a direction connecting the vacuum interrupter and the insulator to achieve electric field relaxation; a gas tank in which the vacuum interrupter, the insulating rod, the insulator, and the movable side shield are disposed; an operating mechanism which is disposed on a movable side end portion of the gas tank and is connected to the insulating rod; and an operating box in which the operating mechanism is placed. The gas insulated switchgear is configured such that: an inner circumferential side space of the bellows of the vacuum interrupter, an internal space of the movable side shield, an internal space of the insulator, and an internal space of the operating box are communicated with each other; and pressure in these spaces is lower than pressure in the gas tank.

According to a second aspect of the present invention, there is provided a gas insulated switchgear including: a vacuum interrupter having a movable contact and a fixed contact in vacuum, the movable contact being provided on one side of a movable conductor that passes through a bellows, and the fixed contact being provided on a fixed conductor; an insulating rod coupled to the other side of the movable conductor that passes through the bellows of the vacuum interrupter; an insulator in which the insulating rod and the other side of the movable conductor are placed, and by which the vacuum interrupter is electrically insulated and supported; a movable side shield which intervenes between the vacuum interrupter and the insulator, and surrounds the outer circumference of the other side of the movable conductor along a direction connecting the vacuum interrupter and the insulator to achieve electric field relaxation; a gas tank in which the vacuum interrupter, the insulating rod, the insulator, and the movable side shield are disposed; an operating mechanism which is disposed on a movable side end portion of the gas tank and is connected to the insulating rod; and an operating box in which the operating mechanism is placed. The gas insulated switchgear is configured such that: an inner circumferential side space of the bellows of the vacuum interrupter, an internal space of the movable side shield, an internal space of the insulator, an internal space of the operating box, and an external space of the operating box are communicated with each other; and pressure in these spaces is lower than pressure in the gas tank.

According to a third aspect of the present invention, there is provided a gas insulated switchgear including: a vacuum interrupter having a movable contact and a fixed contact in vacuum, the movable contact being provided on one side of a movable conductor that passes through a bellows, and the fixed contact being provided on a fixed conductor; an insulating rod coupled to the other side of the movable conductor that passes through the bellows of the vacuum interrupter; an insulator in which the insulating rod and the other side of the movable conductor are placed, and by which the vacuum interrupter is electrically insulated and supported; a movable side shield which intervenes between the vacuum interrupter and the insulator, and surrounds the outer circumference of the other side of the movable conductor along a direction connecting the vacuum interrupter and the insulator to achieve electric field relaxation; a gas tank in which the vacuum interrupter, the insulating rod, the insulator, and the movable side shield are disposed; an operating mechanism which is disposed on a movable side end portion of the gas tank and is connected to the insulating rod; and an operating box in which the operating mechanism is placed. The gas insulated switchgear is configured such that: an inner circumferential side space of the bellows of the vacuum interrupter, an internal space of the movable side shield, an internal space of the insulator, and an internal space of the operating box are communicated with each other; pressure in these spaces is lower than pressure in the gas tank; and the operating box is sealed with respect to an external space of the operating box.

Furthermore, according to a fourth aspect of the present invention, there is provided a gas insulated switchgear including: a vacuum interrupter having a movable contact and a fixed contact in vacuum, the movable contact being provided on one side of a movable conductor that passes through a bellows, and the fixed contact being provided on a fixed conductor; an insulating rod coupled to the other side of the movable conductor that passes through the bellows of the vacuum interrupter; an insulator in which the insulating rod and the other side of the movable conductor are placed, and by which the vacuum interrupter is electrically insulated and supported; a movable side shield which intervenes between the vacuum interrupter and the insulator, and surrounds the outer circumference of the other side of the movable conductor along a direction connecting the vacuum interrupter and the insulator to achieve electric field relaxation; an electric field relaxation shield in which one end is connected to the movable side shield, and which is disposed extending from an end portion on the vacuum interrupter side of the insulator toward the opposite side to the vacuum interrupter at an outer circumferential portion or at the inside of resin along the axial direction of the insulator; a gas tank in which the vacuum interrupter, the insulating rod, the insulator, the movable side shield, and the electric field relaxation shield are disposed; an operating mechanism which is disposed on a movable side end portion of the gas tank and is connected to the insulating rod; and an operating box in which the operating mechanism is placed. The gas insulated switchgear is configured such that: an inner circumferential side space of the bellows of the vacuum interrupter, an internal space of the insulator, and an internal space of the operating box are communicated with each other; and pressure in these spaces is lower than pressure in the gas tank.

Advantageous Effect of the Invention

According to a gas insulated switchgear of the present invention, a configuration is made such that: an inner circumferential side space of a bellows of a vacuum interrupter, an internal space of an insulator, and an internal space of an operating box are communicated with each other; and pressure in these spaces is lower than pressure in a gas tank; whereby, there can be obtained a gas insulated switchgear capable of reducing differential pressure of a bellows portion of the vacuum interrupter.

MODE FOR CARRYING OUT THE INVENTION

Embodiment 1

Figure 1:
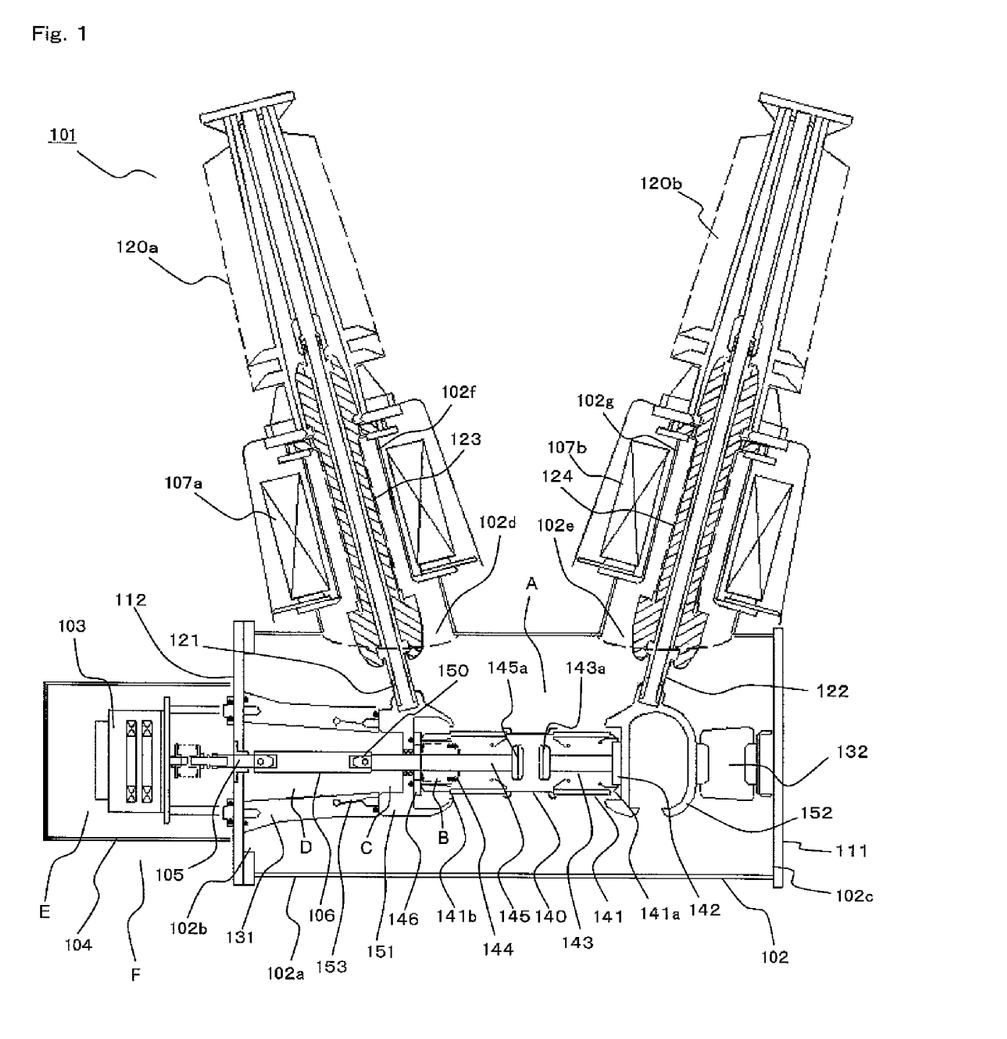
FIG. 1 is a sectional view showing a gas insulated switchgear according to Embodiment 1 of the present invention.
Figure 2:
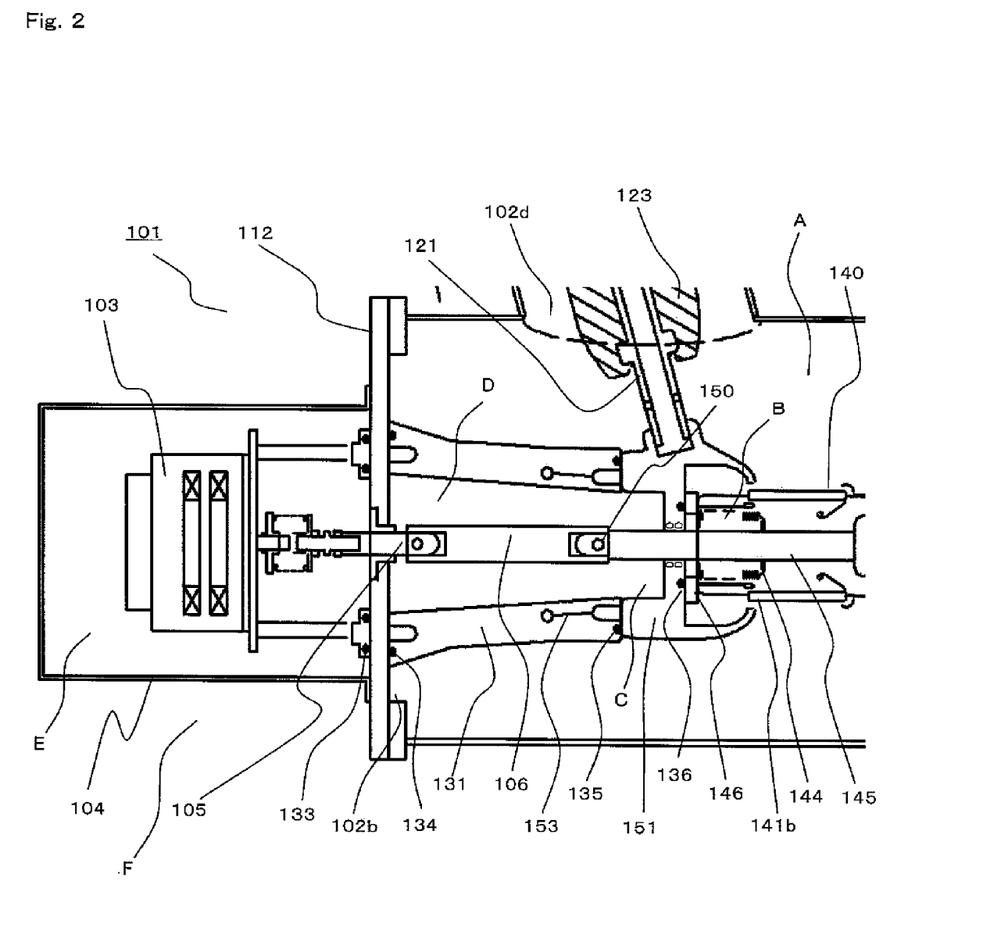
FIG. 2 is a relevant part enlarged sectional view showing the gas insulated switchgear according to Embodiment 1 of the present invention.

Hereinafter, Embodiment 1 of the present invention will be described with reference to FIG. 1 and FIG. 2. Then, in each of the drawings, identical or equivalent members and portions will be described with the same reference numerals assigned thereto. FIG. 1 is a sectional view showing a gas insulated switchgear according to Embodiment 1 of the present invention. FIG. 2 is a relevant part enlarged sectional view showing the gas insulated switchgear according to Embodiment 1 of the present invention.

Reference numeral 101 denotes a gas insulated switchgear. An electrically grounded gas tank 102 is installed with a torso portion 102a being kept horizontal; and on both ends thereof, a movable side opening portion 102b and a fixed side opening portion 102c are provided. Incidentally, an insulating gas such as dry air, nitrogen, or carbonic anhydride is filled in an internal space A of the gas tank 102 at a high pressure as an insulating gas. In addition, as the insulating gas in Embodiment 1, for example, dry air substantially zero in global warming potential and effective for global warming prevention is filled at a high pressure.

Furthermore, a movable side opening portion 102d and a fixed side opening portion 102e are provided on the upper side of the gas tank 102. A movable side branch pipe 102f coaxial with the movable side opening portion 102d, a fixed side branch pipe 102g coaxial with the fixed side opening portion 102e, and flanges for connecting these pipes are constituted. A current transformer for measuring current 107a is mounted on an outer circumferential portion of the movable side branch pipe 102f; and a current transformer for measuring current 107b is mounted on an outer circumferential portion of the fixed side branch pipe 102g, respectively.

A vacuum interrupter 140 is placed in the gas tank 102 via an air gap formed with respect to the torso portion 102a. The vacuum interrupter 140 is composed of a tubular vacuum vessel 141 made of insulation material such as ceramics; a fixed conductor 143 which is placed in the vacuum vessel 141, one end of the fixed conductor 143 being joined to an end plate 142 which is for airtight sealing a fixed side end portion 141a of the vacuum vessel 141; and a movable conductor 145 which is disposed to be capable of being connected/disconnected to/from the fixed conductor 143, the other end of the movable conductor 145 being extended outside the vacuum vessel 141 via a bellows 144 attached to an end plate 146 which is for airtight sealing a movable side end portion 141b of the vacuum vessel 141.

An operating mechanism 103 by which a fixed contact 143a and a movable contact 145a are connected/disconnected to be closed/opened is provided outside the gas tank 102. The operating mechanism 103 is made to move the movable conductor 145 in a horizontal direction via an operating rod 105 and an insulating rod 106; and accordingly, the fixed contact 143a and the movable contact 145a are connected/disconnected to be closed/opened. At this time, the bellows 144 follows the movement of the movable conductor 145; and therefore, the inside of the vacuum interrupter 140 is maintained under vacuum.

Incidentally, the insulating rod 106 is coupled to the operating rod 105 and the movable conductor 145 at both ends thereof (pin coupling is shown in the drawing). The insulating rod 106 is connected while securing an insulation distance in which the movable conductor 145 can be electrically insulated from the operating rod 105. Reference numeral 150 denotes a coupling end portion between the insulating rod 106 and the movable conductor 145.

A movable side shield 151 and a fixed side shield 152 are provided on both ends of the vacuum interrupter 140. The movable side shield 151 has a shape covering the movable side end portion 141b of the vacuum interrupter 140 and is connected to the movable side end plate 146; and the fixed side shield 152 has a shape covering the fixed side end portion 141a and is connected to the fixed side end plate 142. Furthermore, the movable side shield 151 is mechanically held by a movable side insulator 131 while maintaining insulation with respect to the gas tank 102; and the fixed side shield 152 is mechanically held by a fixed side insulator 132, while maintaining insulation with respect to the gas tank 102. The movable side insulator 131 and the fixed side insulator 132 are formed of insulating resin.

A movable side external conductor 121 connected to an upper part of a movable side bushing 120a is connected to the movable side shield 151 in an insertion manner; and a fixed side external conductor 122 connected to an upper part of a fixed side bushing 120b is connected to the fixed side shield 152 in an insertion manner.

Such a gas insulated switchgear is of a structure in which, for example, electric power taken in from the upper portion of the fixed side porcelain bushing 120b is taken out to the upper portion of the movable side bushing 120a via the vacuum interrupter 140. In the normally flowing current and electric power system, a fault current generated when an electrical fault (ground short fault and/or short-circuit fault) occurs is interrupted by the vacuum interrupter 140; and consequently, the gas insulated switchgear has a function of preventing spread of the fault to peripheral apparatuses.

FIG. 2 shows the relevant part enlarged sectional view of the gas insulated switchgear 101 according to Embodiment 1 of the present invention. That is, the enlarged structure of the periphery of the movable side of the vacuum interrupter 140 is shown. In Embodiment 1, a configuration is made such that: an inner circumferential side space B of the bellows 144 of the vacuum interrupter 140, an internal space C of the movable side shield 151, an internal space D of the movable side insulator 131, and an internal space E of the operating box 104 are communicated with each other; these spaces and an external space F of the operating box 104 are further communicated with each other, the external space F being formed outside the gas tank; the respective spaces are made to the same pressure, that is, spaces at atmospheric pressure; and the pressure in the respective spaces is lower than pressure in the internal space A of the gas tank 102. In order to achieve this, fixed sealing portions 133 to 136 are required. In the fixed sealing portions, the fixed sealing portion 135 and the fixed sealing portion 136 are made of heat resistant material, because the temperature of the movable side shield 151 is likely to be increased.

That is, in order to set the inner circumferential side of the bellows 144 to the atmospheric pressure, the atmosphere can be taken in from the periphery of the operating box 104 near the gas tank 102; and therefore, inspection and replacement of a filter at a place through which the atmosphere is taken in can be achieved by a simple work.

Furthermore, in Embodiment 1, a linear sealing portion into which the operating rod 105 or the movable conductor 145 is slid while maintaining airtight is not required; and therefore, airtightness of the respective spaces B to E becomes highly reliable. Additionally, operation energy required for the operating mechanism 103 can be reduced; and therefore, a reduction in size, simplification, and a reduction in cost of the operating mechanism 103 can be achieved.

Besides, in the movable side shield 151, an electric field relaxation function of the movable side end portion 141b of the vacuum interrupter 140, a fixing function with respect to the movable side insulator 131, and a connection function with respect to the movable side external conductor 121 are consolidated into one component; and therefore, as compared to the aforementioned conventional switchgear, the number of sealing places can be reduced and economic efficiency is excellent.

By the way, in the case where the inner circumferential side space B of the bellows 144 of the vacuum interrupter 140, the internal space C of the movable side shield 151, the internal space D of the movable side insulator 131, and the internal space E of the operating box 104 are required to be prevented from the influence of humidity and contaminated atmosphere, for example, desiccant is disposed inside the operating box 104 in which the operating mechanism 103 is placed, and a portion to be mounted on a cover plate 112 of the operating box 104 and a joint of the operating box 104 itself are covered with a gasket and/or by welding; and consequently, its purpose can be achieved.

Further, an electric field relaxation shield 153 connected to an embedded fixing metal fitting is disposed at the inside of resin of the movable side insulator 131. The electric field relaxation shield 153 is made of, for example, copper net, aluminum die-casting, conductive plastic, or the like. Then, an end portion of the electric field relaxation shield 153 is disposed by being extended to a place nearer to a movable side end portion of the gas tank 102 than the coupling end portion 150 between the insulating rod 106 and the other side of the movable conductor 145, that is, extended to a position near the cover plate 112; and consequently, an electric field of the periphery of the coupling end portion 150 can be relaxed. The periphery of the insulating rod 106 is covered by the atmosphere of low pressure; and therefore, creeping electric fields of the coupling end portion 150 and the insulating rod 106 need to be sufficiently reduced; however, it becomes possible to achieve its electric field relaxation by the electric field relaxation shield 153.

As described above, according to Embodiment 1, differential pressure of a bellows 144 portion of the vacuum interrupter 140 can be reduced and mechanical stress generated at the bellows 144 portion is relaxed; as a result, a mechanical life can be extended. Further, an airtight function between a movable portion of the vacuum interrupter 140 and a high pressure portion of the gas tank 102 is not required; and therefore, reliability of an airtight portion is improved and constitutional components can be inexpensive.

Embodiment 2

Figure 3:
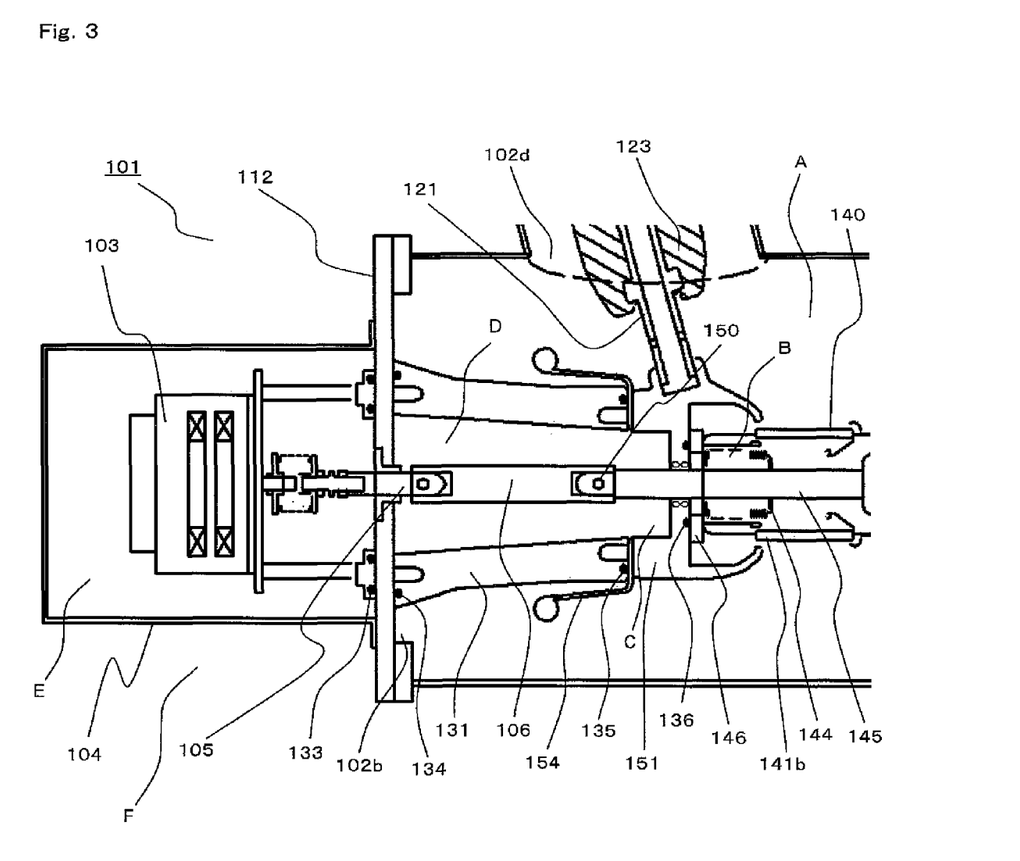
FIG. 3 is a relevant part enlarged sectional view showing a gas insulated switchgear according to Embodiment 2 of the present invention.

A gas insulated switchgear according to Embodiment 2 of the present invention will be described with reference to FIG. 3. FIG. 3 is a relevant part enlarged sectional view showing the gas insulated switchgear according to Embodiment 2 of the present invention.

In Embodiment 2, an electric field relaxation shield 154 is disposed at the outside of a movable side insulator 131 and is connected to a movable side shield 151.

By this structure, the movable side insulator 131 can be more easily manufactured than the structure in which the electric field relaxation shield is provided at the inside of resin of the movable side insulator 131.

Embodiment 3

Figure 4:
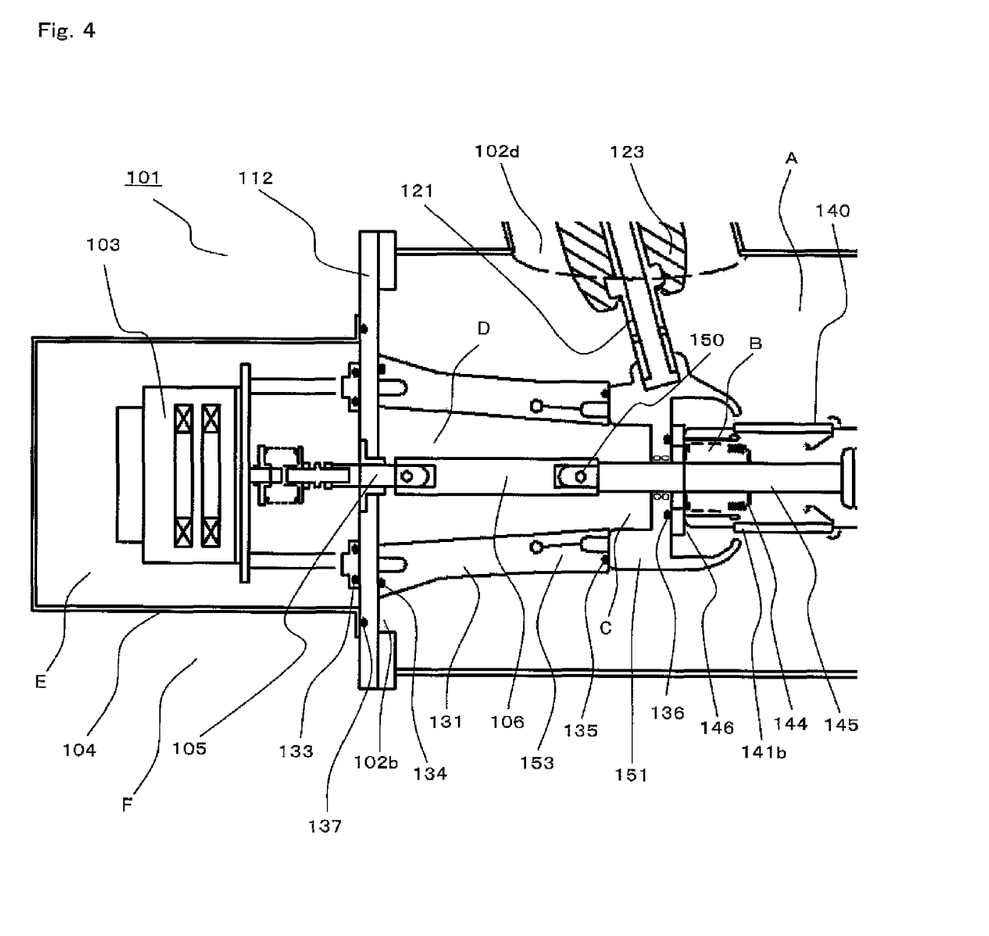
FIG. 4 is a relevant part enlarged sectional view showing a gas insulated switchgear according to Embodiment 3 of the present invention.

A gas insulated switchgear according to Embodiment 3 of the present invention will be described with reference to FIG. 4. FIG. 4 is a relevant part enlarged sectional view showing the gas insulated switchgear according to Embodiment 3 of the present invention.

In Embodiment 3, a configuration is made such that: an inner circumferential side space B of a bellows 144 of a vacuum interrupter 140, an internal space C of a movable side shield 151, an internal space D of a movable side insulator 131, and an internal space E of an operating box 104 are communicated with each other; pressure in these spaces B to E is configured to be lower than pressure in a gas tank 102; and the operating box 104 is provided with a sealing portion 137 which is sealed with respect to an external space F of the operating box 104. The relationship of pressure in the respective spaces is configured so as to be A>B to E>F (the ambient atmosphere).

That is, the operating box 104 is a pressure vessel; the insulating gas such as dry air or nitrogen is filled in the spaces B to E, and the pressure in the spaces B to E is lower than the pressure in the gas tank 102 and is made to increase up to a pressure that does not impair the mechanical life of the bellows 144; and consequently, insulation performance of the periphery of an insulating rod 106 can be further improved as compared to the case of the atmospheric pressure in the aforementioned Embodiment 1. As a result, a reduction in size and simplification of the movable side insulator 131, the insulating rod 106, and an electric field relaxation shield 153 can be achieved; and simplification of a coupling end portion 150 between the insulating rod 106 and the other side of a movable conductor 145 can be achieved. Therefore, there can be obtained a gas insulated switchgear which is excellent in economic efficiency.

By the way, Embodiment 3 can be applied to the aforementioned Embodiment 2, and there can be obtained a gas insulated switchgear which is excellent in economic efficiency.

INDUSTRIAL APPLICABILITY

The present invention is suitable for achieving a gas insulated switchgear capable of reducing differential pressure of a bellows portion of a vacuum interrupter.

The invention claimed is:

1. A gas insulated switchgear comprising:
   a vacuum interrupter having a movable contact and a fixed contact in vacuum, said movable contact being provided on one side of a movable conductor that passes through a bellows, and said fixed contact being provided on a fixed conductor;
   an insulating rod coupled to the other side of said movable conductor that passes through said bellows of said vacuum interrupter;
   an insulator in which said insulating rod and the other side of said movable conductor are placed, and by which said vacuum interrupter is electrically insulated and supported;
   a movable side shield which intervenes between said vacuum interrupter and said insulator, and surrounds the outer circumference of at least a part of the bellows along a direction connecting said vacuum interrupter and said insulator to achieve electric field relaxation;
   a gas tank in which said vacuum interrupter, said insulating rod, said insulator, and said movable side shield are disposed;
   an operating mechanism which is disposed on a movable side end portion of said gas tank and is connected to said insulating rod; and
   an operating box in which said operating mechanism is placed,
   said gas insulated switchgear being configured such that:
   an inner circumferential side space of said bellows of said vacuum interrupter, an internal space of said movable side shield, an internal space of said insulator, and an internal space of said operating box are communicated with each other; and
   pressure in these spaces is lower than pressure in said gas tank.

2. A gas insulated switchgear comprising:
   a vacuum interrupter having a movable contact and a fixed contact in vacuum, said movable contact being provided on one side of a movable conductor that passes through a bellows, and said fixed contact being provided on a fixed conductor;
   an insulating rod coupled to the other side of said movable conductor that passes through said bellows of said vacuum interrupter;

an insulator in which said insulating rod and the other side of said movable conductor are placed, and by which said vacuum interrupter is electrically insulated and supported;

a movable side shield which intervenes between said vacuum interrupter and said insulator, and surrounds the outer circumference of at least a part of the bellows along a direction connecting said vacuum interrupter and said insulator to achieve electric field relaxation;

a gas tank in which said vacuum interrupter, said insulating rod, said insulator, and said movable side shield are disposed;

an operating mechanism which is disposed on a movable side end portion of said gas tank and is connected to said insulating rod; and an operating box in which said operating mechanism is placed, said gas insulated switchgear being configured such that:

an inner circumferential side space of said bellows of said vacuum interrupter, an internal space of said movable side shield, an internal space of said insulator, an internal space of said operating box, and an external space of said operating box are communicated with each other; and pressure in these spaces is lower than pressure in said gas tank.

3. A gas insulated switchgear comprising:

a vacuum interrupter having a movable contact and a fixed contact in vacuum, said movable contact being provided on one side of a movable conductor that passes through a bellows, and said fixed contact being provided on a fixed conductor;

an insulating rod coupled to the other side of said movable conductor that passes through said bellows of said vacuum interrupter;

an insulator in which said insulating rod and the other side of said movable conductor are placed, and by which said vacuum interrupter is electrically insulated and supported;

a movable side shield which intervenes between said vacuum interrupter and said insulator, and surrounds the outer circumference of at least a part of the bellows along a direction connecting said vacuum interrupter and said insulator to achieve electric field relaxation;

a gas tank in which said vacuum interrupter, said insulating rod, said insulator, and said movable side shield are disposed;

an operating mechanism which is disposed on a movable side end portion of said gas tank and is connected to said insulating rod; and an operating box in which said operating mechanism is placed, said gas insulated switchgear being configured such that:

an inner circumferential side space of said bellows of said vacuum interrupter, an internal space of said movable side shield, an internal space of said insulator, and an internal space of said operating box are communicated with each other;

pressure in these spaces is lower than pressure in said gas tank; and said operating box is sealed with respect to an external space of said operating box.

4. A gas insulated switchgear comprising:

a vacuum interrupter having a movable contact and a fixed contact in vacuum, said movable contact being provided on one side of a movable conductor that passes through a bellows, and said fixed contact being provided on a fixed conductor;

an insulating rod coupled to the other side of said movable conductor that passes through said bellows of said vacuum interrupter;

an insulator in which said insulating rod and the other side of said movable conductor are placed, and by which said vacuum interrupter is electrically insulated and supported;

a movable side shield which intervenes between said vacuum interrupter and said insulator, and surrounds the outer circumference of at least a part of the bellows along a direction connecting said vacuum interrupter and said insulator to achieve electric field relaxation;

an electric field relaxation shield in which one end is connected to said movable side shield, and which is disposed extending from an end portion on the vacuum interrupter side of said insulator toward the opposite side to said vacuum interrupter at an outer circumferential portion or at the inside of resin along the axial direction of said insulator;

a gas tank in which said vacuum interrupter, said insulating rod, said insulator, said movable side shield, and said electric field relaxation shield are disposed;

an operating mechanism which is disposed on a movable side end portion of said gas tank and is connected to said insulating rod; and an operating box in which said operating mechanism is placed, said gas insulated switchgear being configured such that:

an inner circumferential side space of said bellows of said vacuum interrupter, an internal space of said insulator, and an internal space of said operating box are communicated with each other; and pressure in these spaces is lower than pressure in said gas tank.

5. The gas insulated switchgear according to claim 4, wherein said electric field relaxation shield is disposed extending from an end portion on the vacuum interrupter side of said insulator to a place near the movable side end portion of said gas tank at the inside of said insulator.

6. The gas insulated switchgear according to claim 4, wherein said electric field relaxation shield is disposed extending from an end portion on the vacuum interrupter side of said insulator to a place near the movable side end portion of said gas tank at the outside of said insulator.

7. The gas insulated switchgear according to claim 1, wherein said movable side shield has a current-carrying function between a movable side external conductor and said vacuum interrupter, said movable side external conductor being disposed passing through in a movable side porcelain bushing.

8. The gas insulated switchgear according to claim 2, wherein said movable side shield has a current-carrying function between a movable side external conductor and said vacuum interrupter, said movable side external conductor being disposed passing through in a movable side porcelain bushing.

9. The gas insulated switchgear according to claim 3, wherein said movable side shield has a current-carrying function between a movable side external conductor and said vacuum interrupter, said movable side external conductor being disposed passing through in a movable side porcelain bushing.

10. The gas insulated switchgear according to claim 4, wherein said movable side shield has a current-carrying function between a movable side external conductor and said vacuum interrupter, said movable side external conductor being disposed passing through in a movable side porcelain bushing.

11. The gas insulated switchgear according to claim 5, wherein said movable side shield has a current-carrying function between a movable side external conductor and said vacuum interrupter, said movable side external conductor being disposed passing through in a movable side porcelain bushing.

12. The gas insulated switchgear according to claim 6, wherein said movable side shield has a current-carrying function between a movable side external conductor and said vacuum interrupter, said movable side external conductor being disposed passing through in a movable side porcelain bushing.

13. The gas insulated switchgear according to claim 1, wherein said movable side shield is directly connected to an external conductor that passes into a bushing of the gas insulated switchgear.

14. The gas insulated switchgear according to claim 2, wherein said movable side shield is directly connected to an external conductor that passes into a bushing of the gas insulated switchgear.

15. The gas insulated switchgear according to claim 3, wherein said movable side shield is directly connected to an external conductor that passes into a bushing of the gas insulated switchgear.

16. The gas insulated switchgear according to claim 4, wherein said movable side shield is directly connected to an external conductor that passes into a bushing of the gas insulated switchgear.

* * * * *